United States Patent
Kuo et al.

(10) Patent No.: US 9,311,526 B2
(45) Date of Patent: Apr. 12, 2016

(54) IMAGE PROCESSING SYSTEM AND METHOD OF IMPROVING HUMAN FACE RECOGNITION

(71) Applicant: ASUSTeK COMPUTER INC., Taipei (TW)

(72) Inventors: Hsiu-Jui Kuo, Taipei (TW); Yu-Cheng Liu, Taipei (TW); Yi-Chi Cheng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 14/252,792

(22) Filed: Apr. 15, 2014

(65) Prior Publication Data

US 2014/0348399 A1 Nov. 27, 2014

(30) Foreign Application Priority Data

May 22, 2013 (TW) .............................. 102118075 A

(51) Int. Cl.
*G06K 9/00* (2006.01)

(52) U.S. Cl.
CPC ........ *G06K 9/00288* (2013.01); *G06K 9/00228* (2013.01)

(58) Field of Classification Search
CPC ............ G06K 9/00228; G06K 9/2027; G06K 9/00288; G06T 5/007
See application file for complete search history.

(56) References Cited

U.S. PATENT DOCUMENTS

| 7,469,072 | B2 | 12/2008 | Yano |
| 8,121,404 | B2 | 2/2012 | Xiao et al. |
| 2007/0036443 | A1* | 2/2007 | Srinivasan ..................... 382/232 |
| 2009/0175511 | A1* | 7/2009 | Lee et al. ....................... 382/118 |
| 2013/0070973 | A1 | 3/2013 | Saito et al. |
| 2014/0044372 | A1* | 2/2014 | Mertens ........................ 382/248 |

FOREIGN PATENT DOCUMENTS

WO 2012147022 A2 11/2012

* cited by examiner

*Primary Examiner* — Edward Park

(74) *Attorney, Agent, or Firm* — CKC & Partners Co., Ltd.

(57) ABSTRACT

An image processing method includes following steps: capturing an image including a human face; executing a face detection in a predetermined area of the image; adjusting an exposure value of the predetermined area to an expected value when the face detection does not recognize the human face; executing the face detection and analyzing an image information in a face area of the image when the exposure value of the predetermined area reaches the expected value; and selecting a model parameter and an image adjusting parameter correspondingly according to the image information, processing the face area of the image, and outputting a processed image to a human face recognition system.

5 Claims, 4 Drawing Sheets

IMAGE PROCESSING SYSTEM AND METHOD OF IMPROVING HUMAN FACE RECOGNITION

CROSS-REFERENCE TO RELATED APPLICATION

This application claims the priority benefit of Taiwan application serial No. 102118075, filed on May 22, 2013. The entirety of the above-mentioned patent applications are hereby incorporated by references herein and made a part of specification.

BACKGROUND OF THE INVENTION

1. Field of the Invention

The invention relates to an image processing system and, more particularly, to an image processing system and an image processing method of improving human face recognition.

2. Description of the Related Art

Human face recognition technology is applied to a human-computer interface, home video surveillance or face recognition of biology detection and image database management. Thus, the human face recognition technology is important in the image recognition technology. However, human face recognition has high difficulties and variations. For example, a human face recognition system cannot capture enough biological information when user stands in an imperfectly illuminated environment.

BRIEF SUMMARY OF THE INVENTION

An image processing system and an image processing method of improving human face recognition are provided.

The image processing method including following steps: capturing an image including a human face; executing a face detection in a predetermined area of the image; adjusting an exposure value of the predetermined area to an expected value when the face detection does not recognize the human face; executing the face detection and analyzing an image information in a face area of the image when the exposure value of the predetermined area reaches the expected value; selecting a model parameter and an image adjusting parameter corresponding to the model parameter according to the image information and processing the face area of the image; and outputting a processed image to the human face recognition system.

The image processing system includes a camera device, a face detection unit, an exposure value adjusting unit, an image analyzing unit, an image processing unit and an image outputting unit. The camera device captures an image including a human face. The face detection unit executes a face detection in a predetermined area of the image. When the face detection does not recognize the human face, the exposure value adjusting unit adjusts exposure value of the predetermined area to an expected value. When the exposure value of the predetermined area reaches the expected value, the image analyzing unit executes the face detection and analyzes an image information in a face area of the image. The image processing unit selects a model parameter and an image adjusting parameter corresponding to the model parameter according to the image information and processes the face area of the image. The image outputting unit outputs a processed image to the human face recognition system.

These and other features, aspects and advantages of the present invention will become hotter understood with regard to the following description, appended claims, and accompanying drawings.

DETAILED DESCRIPTION OF THE EMBODIMENTS

An image processing system and an image processing method of improving human face recognition are illustrated with relating figures, and the same symbols denote the same components. Some familiar components or steps are not illustrated hereinafter to avoid unnecessary limitations.

In embodiments, the article "a" or "the" represents one or multiple components unless specially defined. The word "about", "approximately" or "almost" can be used with a number, which represents that the number can be changed but the change would not substantially affect the nature of the object which are limited by the number, and an allowable error range of the number is within 20%, preferably within 10%, and most preferably within 5%.

Figure 1:
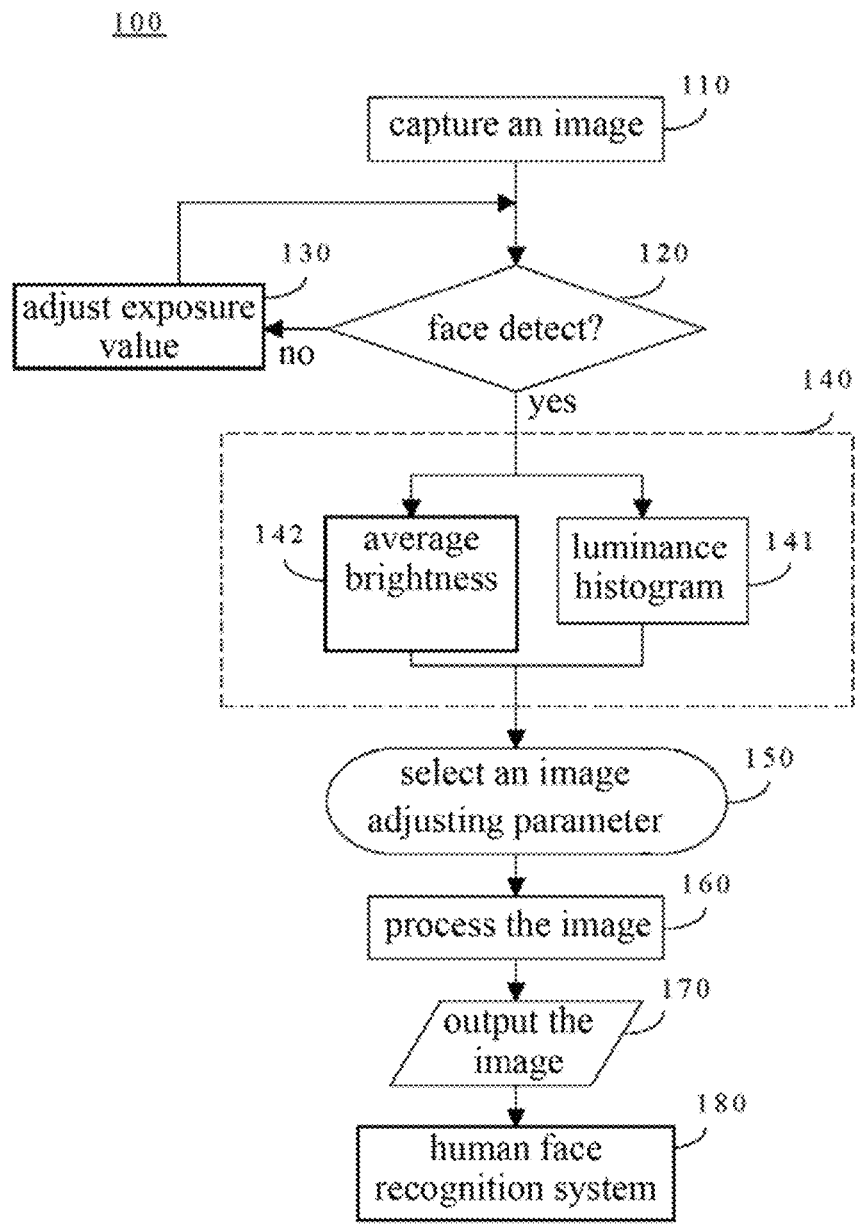
FIG. 1 is a flow chart showing an image processing method of improving human face recognition in an embodiment.

FIG. 1 is a flow chart showing an image processing method 100 of improving human face recognition in an embodiment. As shown in FIG. 1, the image processing method 100 includes steps 110 to 180 (in the embodiment, a sequence of the steps can be adjusted, and all or a part of the steps can be executed at the same time, unless the sequence is specifically stated).

Figure 5A:
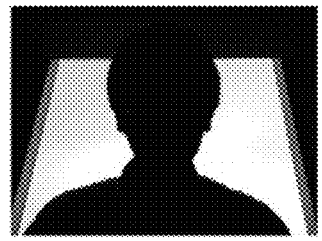
FIG. 5A, FIG. 5B and FIG. 5C are schematic diagrams showing, an image in an embodiment.

In step 110, an image including a human face is captured. For example, a camera device may be used to capture a user face image, and the camera device may be an embedded camera or an external camera of an electronic device. The image captured by the camera device is displayed in a preview picture at a screen of the electronic device. The user usually faces the central position of the preview picture. When the camera device captures the image including a human face, a sharp image can be captured under normal conditions. However, in a circumstance of back lighting or low ambient light, an auto exposure function cannot adjust the exposure value to a proper value, and the human face in the image cannot be recognized. Please refer to FIG. 5A to FIG. 6C, when back lighting, since the brightness of the background in the image shown in FIG. 5A is too high, the average exposure value in the center is low, and the average exposure value is about 16. In low ambient light as showed in FIG. 6A, the image is too dark, and the average exposure value in the center is just about 43. Thus, the human face in the image cannot be recognized.

In step 120, a face detection is executed in a predetermined area of the image. In the embodiment, it is mainly determined that whether the image includes a human face in the step 120. For example, a cascade classifier algorithm of Viola-Jones may be used to detect whether a human face exists in the predetermined area (such as a central area) of the image, so as to search the human face image of various postures and sizes rapidly and efficiently. In the embodiment, the mechanism of the face detection is different from that of a human face recognition system in the step 180. In the face detection mechanism, whether a human face exists in the image is detected, and the human face recognition system in the step 180 further identifies and recognizes the biological features of the human face in the image.

Figure 2:
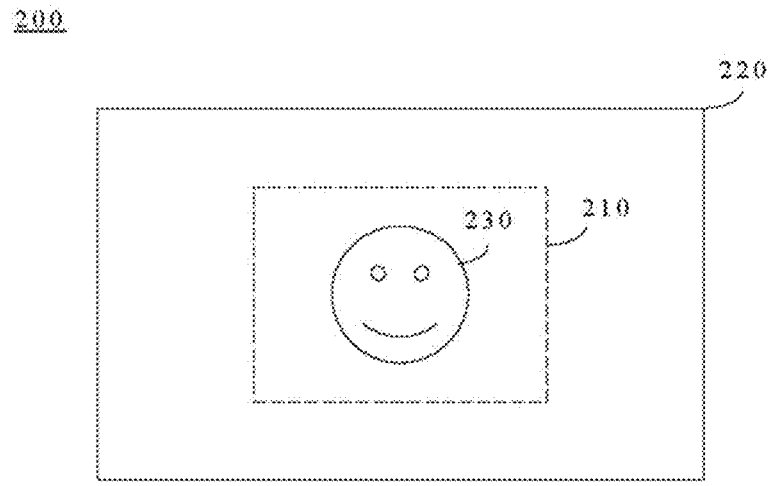
FIG. 2 is a schematic diagram showing a predetermined area of an image in an embodiment.

The predetermined area 210 shown in FIG. 2 is smaller than the frame 220 of the image 200, and since human faces are often be placed in the central part of an image, the predetermined area 210 is in the central area of the frame 220 of the image 200. Thus, the face area 230 is in the predetermined area 210. The proportion of the predetermined area 210 in the frame 220 can be adjusted according to different electronic devices.

In the step 120, if the human face in the predetermined area of the image cannot be recognized, that is, the face detection cannot be finished, it means that in the step 110, the image including the human face is captured in a circumstance of back lighting or low ambient light. Thus, the exposure value of the image is adjusted in the step 130. First, the average exposure value of the predetermined area of the image is detected, and the value of the average exposure value is determined. Then, the detected average exposure value is compared with an expected value. If the average exposure value is smaller than the expected value, it means that the image is captured in a circumstance of back lighting or low ambient light, and then the exposure value of the image is adjusted in the step 130, which means the exposure value in the predetermined area is adjusted.

In a circumstance of back lighting or low ambient light, the average exposure value of a central area (the predetermined area) is increased by gradually adjusting a threshold according to a lookup table in the step 130. When the average exposure value is adjusted, the face detection of the adjusted image continues in the step 120 until the exposure value of the predetermined area reaches the expected value, and the face area of the image is recognized in the step 120.

Figure 5B:
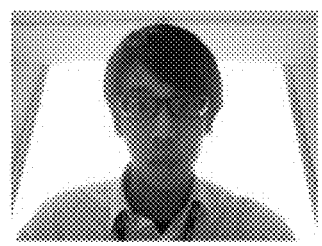

For example, in a circumstance of back lighting, the image shown in FIG. 5A can be adjusted in the step 130 to have appropriate exposure value shown in FIG. 5B, and the exposure value in the central area of the image is about 84. In a circumstance of low ambient light, the image shown in FIG. 6A can be adjusted in the step 130 to have appropriate exposure value shown in FIG. 6B, and the exposure value in the central area of the image is about 79. If the exposure value of the image is low, the human face cannot be detected in the step 120. However, in a circumstance of low ambient light, if only the exposure value is adjusted in the step 130, though the exposure value of the image is increased, a frame rate of the image is reduced therewith, and the image may have shades or is fuzzy. Thus, the human face recognition system cannot recognize the human face in the step 180. Consequently, the expected value cannot be set too high in order to avoid the decrease of the frame rate. For example, the expected value may be between 70 to 90, such as 85, which is not limited herein. The expected value can be adjusted according to requirements.

When the exposure value in the predetermined area reaches the expected value, the image with appropriate exposure value can be obtained. However, in order to recognize the biological features of the image more clearly by the human face recognition system, the face area of the image should be adjusted. When the image is adjusted, under the condition that the frame rate of the image is not too low, the steps 140 to 160 can be executed to enhance dark areas details of the face area in the image.

Figure 3:
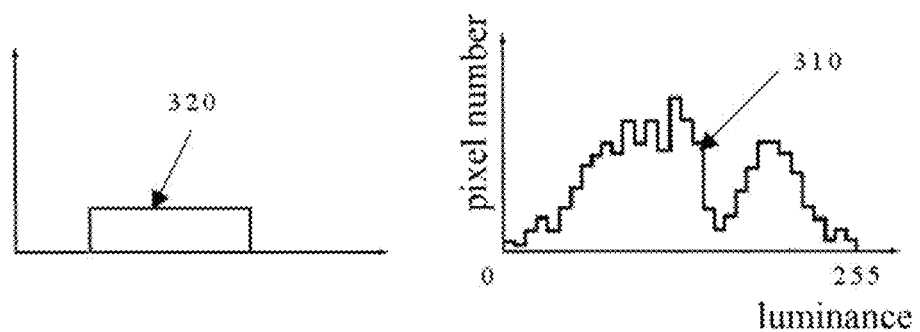
FIG. 3 is a schematic diagram showing image information in an embodiment.

When the exposure value of the predetermined area reaches the expected value and the face detection is finished, image information of the face area in the predetermined area is further analyzed and adjusted in the step 140. As shown in FIG. 3, the step 140 includes sub steps 141 and 142 to analyze a luminance histogram and an average brightness of the face area in the predetermined area, respectively. Please refer to FIG. 3, the chart includes the luminance histogram 310 and the average brightness 320 of the predetermined area. The luminance histogram 310 shows pixels of each luminance, and the average brightness 320 is an average value of the brightness of each pixel at the predetermined area. The luminance histogram and the average brightness of the predetermined area are analyzed to obtain a group of spatial vectors in 256 dimensions as the image information.

Please refer to FIG. 1 again, selecting an image adjusting parameter in step 150 and processing the image in step 160 are executed by a method of a wide dynamic range (WDR) technology according to the image information (the luminance histogram 310 and the average brightness 320). In the WDR technology, a plurality of model parameters of multi-dimensional spatial vectors are pre-established, each of the model parameters has a corresponding WDR parameter, and each group of the model parameters has spatial vectors in 256 dimensions.

In the steps 150 and 160, a WDR parameter can be obtained from a plurality of model parameters of multi-dimensional spatial vectors via the WDR technology, and the WDR parameter corresponds to a spatial vector which is closest to the image information including the group of spatial vectors in 256 dimensions. Then, the image is processed based on the WDR parameter in order to improve the definition of the dark areas of the image, and the brightness of the dark areas is increased more greatly than that of bright areas. In the embodiment, an extended Jaccard similarity coefficient technology can be used to measure an overlapping degree of two groups of spatial vectors, so as to find out a multi-dimensional spatial vector closest to the image from a plurality of pre-established model parameters of multi-dimensional spatial vectors.

Figure 6A:
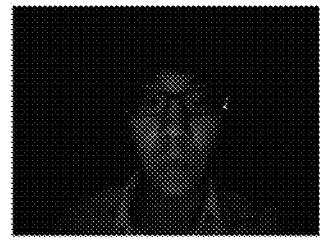
FIG. 6A, FIG. 6B are FIG. 6C are schematic diagrams showing an image in another embodiment.
Figure 6B:
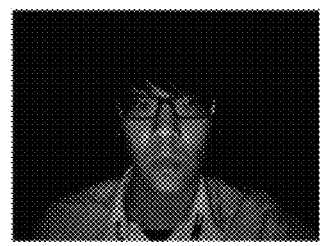
Figure 5C:
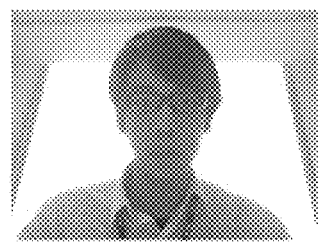
Figure 6C:
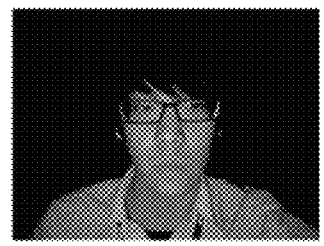

In the step 170, the human face recognition system can obtain a bright and clear image, and then it can capture enough biological features of the human face from the image to identify authentication, which greatly improve a probability of successful detection and recognition. For example, in a circumstance of back lighting, after the steps 150 and 160 are executed, the image shown in FIG. 5B is adjusted to be bright and clear shown in FIG. 5C, and the brightness value in the central area of the image is about 127. In a circumstance of low ambient light, after the step 160, the image shown in FIG. 6B is adjusted to be bright and clear shown in FIG. 6C, and the brightness value of the central area of the image is about 120.

A High Dynamic Range (HDR) image technology may also be used instead of the WDR image technology A scene is pre-established to record a plurality of models and multiple HDR parameters correspondingly. In the step 150, a HDR parameter is found out from a plurality of model parameters of multi-dimensional spatial vectors, and the HDR parameter corresponds to a spatial vector which is closest to the image information including the group of spatial vectors in 256 dimensions. Then, in the step 160, the HDR processing is executed on the image based on the HDR parameter to improve the definition of the dark areas of the face area in the image.

The steps 120 to 180 may be executed via software, hardware or firmware. For example, the image processing method 100 may be applied to any electronic product, such as a notebook computer, a desktop computer, a smart phone or a tablet computer, and the steps can be executed via software, hardware and firmware.

Figure 4:
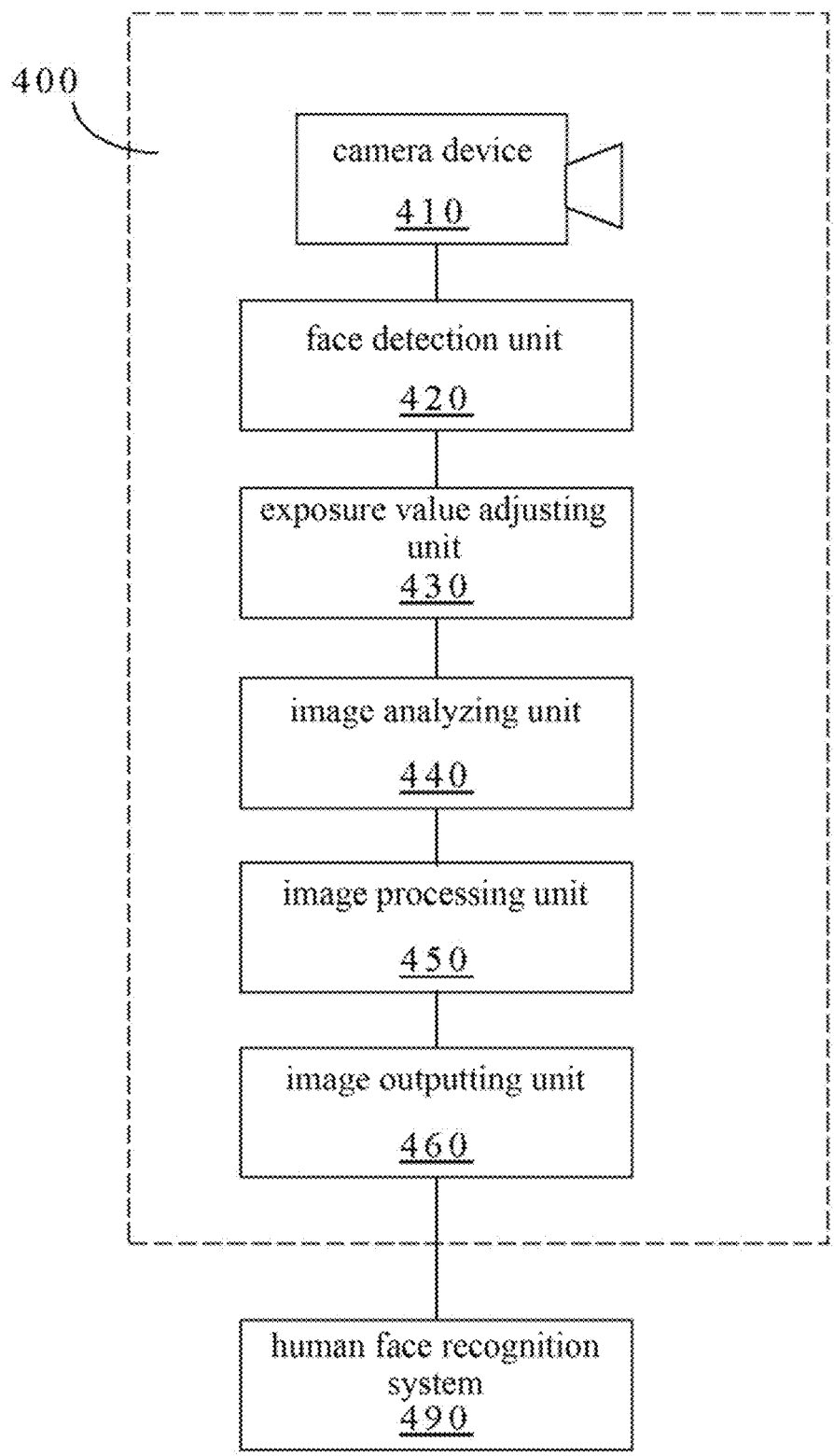
FIG. 4 is a block diagram showing an image processing system of improving human face recognition in an embodiment.

FIG. 4 is a block diagram showing an image processing system 400 of improving human face recognition in an embodiment. As shown in FIG. 4, the image processing system 400 includes a camera device 410, a face detection unit 420, an exposure value adjusting unit 430, an image analyzing unit 440, an image processing unit 450 and an image outputting unit 460.

The camera device 410 captures an image including a human face, and the face detection unit 420 executes a face detection in a predetermined area of the image. When the face detection cannot be executed, the exposure value adjusting unit 430 adjusts an exposure value of the predetermined area to reach an expected value. When the brightness value of the predetermined area reaches the expected value and the face detection is completed, the image analyzing unit 440 analyzes image information of a face area of the image. The image processing unit 450 selects a model parameter and a corresponding image adjusting parameter according to the image information and processes the face area of the image. The image outputting unit 460 outputs the processed image to the human face recognition system 490.

The camera device 410 may be an embedded camera or an external camera of an electronic device, and the image captured by the camera device 410 is usually displayed as a preview picture at screen of the electronic device. The user usually faces the center of the preview picture for human face recognition. If the camera device 410 captures the image in a circumstance of back lighting or low ambient light, an auto exposure function cannot adjust the exposure value to a proper value, and the human face recognition system 490 cannot capture enough biological information from the image. Please refer to FIG. 5A to FIG. 6C, when back lighting as shown in FIG. 5A, since the brightness value is high, the average brightness in the central area of the image is low, and it is about 16. In a circumstance of low ambient light as shown in FIG. 6A, since the whole image is dark, the average brightness in the central area of the image is just about 43.

In the embodiment, the face detection unit 420 determines whether a human face is in the image. For example, the face detection writ 420 may use a cascade classifier algorithm of Viola-Jones to detect the human face in the predetermined area of the image, so as to find the human face image of various postures and sizes rapidly and efficiently. In the embodiment, the face detection unit 420 is different from the human face recognition system 490. The human face recognition system 490 can further identify and recognize biological features of the human face in the image.

When the face detection unit 420 cannot recognize the human face in the image, it means that the image including the human face is captured in a circumstance of back lighting or low ambient light. Thus, the exposure value of the image needs to be adjusted. First, the average exposure value of the predetermined area of the image is detected and the detecting information is sent to the exposure value adjusting unit 430. The exposure value adjusting unit 430 determines the value of the average exposure value of the predetermined area. The exposure value adjusting unit 430 has an expected value and compares the average exposure value with the expected value. If the average exposure value is smaller than the expected value, it means that the image is captured in a circumstance of back lighting or low ambient light, and then the exposure value adjusting unit 430 adjusts the exposure value of the image.

In a circumstance of back lighting or low ambient light, the exposure value adjusting unit 430 increases the average brightness of a central area by gradually adjusting a threshold according to a lookup table. When the average brightness is adjusted, the face detection unit 420 continues recognizing the human face in the adjusted image until the exposure value adjusting unit 430 adjusts the exposure value of the predetermined area to the expected value, and then the face detection unit 420 can find the face area of the image.

For example, in a circumstance of back lighting, the image shown in FIG. 5A can be adjusted to have appropriate brightness value shown in FIG. 5B by the exposure value adjusting unit 430, and the brightness value in the central area of the image is about 84. In a circumstance of low ambient light, the image shown in FIG. 6A can be adjusted to have appropriate brightness value shown in FIG. 6B by the exposure value adjusting unit 430, and the brightness value in the central area of the image is about 79.

If the brightness value of the image is low, the face detection unit 420 cannot detect the human face. However, in a circumstance of low ambient light, if only the exposure value is adjusted by the exposure value adjusting unit 430, though the brightness value of the image is increased, a frame rate of the image is reduced therewith, and the image may have shades or is fuzzy. Thus, the human face recognition system 490 cannot recognize and identify the human face. When the brightness value in the predetermined area reaches the expected value, the image with appropriate brightness value can be captured. Under the condition that the frame rate of the image is not too low, the image analyzing unit 440, the image processing unit 450 and the image outputting unit 460 can be used to lighten the dark areas of the face area in the image.

The expected value cannot be set too low, so as to avoid that the face detection unit 420 cannot detect the face, and the expected value also cannot be set too high in order to avoid the decrease of the frame rate. For example, the expected value may be between 70 to 90, such as 85, which is not limited herein. The expected value can be adjusted according to requirements by persons with ordinary skills in the art.

When the brightness value of the predetermined area reaches the expected value, the image analyzing unit 440 analyzes image information of the predetermined area. The image analyzing unit 440 analyzes a luminance histogram and an average brightness of the face area in the predetermined area, respectively, and combines them to obtain a group of spatial vectors in 256 dimensions as the image information.

The image processing system 400 can pre-establish a scene to record a plurality of models and the image adjusting parameters correspondingly. In the embodiment, a WDR image processing technology is used. First, a plurality of model parameters of multi-dimensional spatial vectors are pre-established, each of the model parameters has a corresponding WDR parameter. The image processing unit 450 finds out a WDR parameter from a plurality of model parameters of multi-dimensional spatial vectors, and the WDR parameter corresponds to a spatial vector which is closest to the image information including the group of spatial vectors in 256 dimensions. Then, the image is processed based on the WDR parameter in order to improve the definition of the dark areas of the image, and the brightness of the dark areas is increased more greatly than that of bright areas.

Thus, the human face recognition system 490 can obtain a bright and clear image, capture enough biological features of the human face from the image to have the identification, which greatly improves a probability of successful detection and recognition. For example, in a circumstance of back lighting, the image shown in FIG. 5B is processed to the bright and clear image shown in FIG. 5C by the image processing unit 450, and the brightness value in the central area of the image is about 127. In a circumstance of low ambient light, the image shown in FIG. 6B is processed to the bright and clear image shown in FIG. 6C by the image processing unit 450, and the brightness value of the central area of the image is about 120.

In the embodiment, the image processing unit 450 applies an extended Jaccard similarity coefficient technology to measure an overlap degree of two groups of spatial vectors, so as to find out a model parameter closest to the group of spatial vectors in 256 dimensions from the pre-established scene.

A High Dynamic Range (HDR) image technology may also be used instead of the WDR image technology. The image processing system 400 first pre-establishes a scene to record a plurality of models and multiple HDR parameters correspondingly. The image processing unit 450 finds out a HDR parameter from a plurality of model parameters, and the HDR parameter corresponds to a spatial vector which is closest to the image information. Then, the image processing unit 450 processes the image based on the HDR parameter to improve the definition of the face area in the image.

The face detection unit 420, the exposure value adjusting unit 430, the image analyzing unit 440, the image processing unit 450 and the image outputting unit 460 can be achieved via software, hardware or firmware. For example, the image processing system 400 may be applied to any electronic product, such as a notebook computer, a desktop computer, a smart phone or a tablet computer, and the image processing system 400 can be achieved via software, hardware and firmware.

In sum, the image captured in a circumstance of back lighting or low ambient light can be adjusted to a bright and clear image, and the adjusted image is sent to the human face recognition system for recognition, which greatly improves a probability of successful detection and recognition.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An image processing method of improving human face recognition, applied to a human face recognition system, the image processing method comprising:
   capturing an image including a human face;
   executing a face detection in a predetermined area of the image, wherein the predetermined area is smaller than the image, and the predetermined area is in a central area of the image;
   adjusting an exposure value of the predetermined area to an expected value when the face detection does not detect a face area of the human face in the predetermined area of the image;
   when the exposure value of the predetermined area reaches the expected value, executing the face detection to detect the face area, and analyzing an image information in the face area;
   selecting a model parameter and an image adjusting parameter corresponding to the model parameter according to the image information and processing the face area of the image, so as to improve a clarity of dark areas of the face area in the image after the face area is detected by the face detection; and
   outputting a processed image to the human face recognition system;
   wherein the image information includes a luminance histogram and an average brightness of the face area; wherein the image adjusting parameter is a wide dynamic range (WDR) parameter; wherein the step of processing the image includes: executing a WDR processing on the image based on the WDR parameter; and wherein in a circumstance of back lighting or low ambient light, the average brightness of a central area is increased by gradually adjusting a threshold according to a lookup table.

2. The image processing method according to claim 1, wherein in the step of capturing the image including, the human face, the image is captured 1w shooting or video recording.

3. The image processing method according to claim 1, wherein when the face detection does not recognize the human face, adjusting the exposure value of the predetermined area until the face detection recognizes the human face.

4. An image processing method of improving human face recognition, applied to a human face recognition system, the image processing method comprising:
   capturing an image including a human face;
   executing a face detection in a predetermined area of the image, wherein the predetermined area is smaller than the image, and the predetermined area is in a central area of the image;
   adjusting an exposure value of the predetermined area to an expected value when the face detection does not detect a face area of the human face in the predetermined area of the image;
   when the exposure value of the predetermined area reaches the expected value, executing the face detection to detect the face area, and analyzing an image information in the face area;
   selecting a model parameter and an image adjusting parameter corresponding to the model parameter according to the image information and processing the face area of the image, so as to improve a clarity of dark areas of the face area in the image after the face area is detected by the face detection; and
   outputting a processed image to the human face recognition system;
   wherein the image adjusting parameter is a wide dynamic range (WDR) parameter;
and wherein WDR parameter uses an extended Jaccard similarity coefficient to measure an overlapping degree of two groups of spatial vectors, so as to find out a multi-dimensional spatial vector closest to the image from a plurality of pre-established model parameters of multi- dimensional spatial vectors.

5. An image processing method of improving human face recognition, applied to a human face recognition system, the image processing method comprising:
   capturing an image including a human face;
   executing a face detection in a predetermined area of the image, wherein the predetermined area is smaller than the image, and the predetermined area is in a central area of the image;

adjusting an exposure value of the predetermined area to an expected value when the face detection does not detect a face area of the human face in the predetermined area of the image;

when the exposure value of the predetermined area reaches the expected value, executing the face detection to detect the face area, and analyzing an image information in the face area;

selecting a model parameter and an image adjusting parameter corresponding to the model parameter according to the image information and processing the face area of the image, so as to improve a clarity of dark areas of the face area in the image after the face area is detected by the face detection; and outputting a processed image to the human face recognition system;

wherein the image information includes a luminance histogram and an average brightness of the face area; and wherein in a circumstance of back lighting or low ambient light, the average brightness of a central area is increased by gradually adjusting a threshold according to a lookup table; and when an average exposure value in the center is low, an average exposure value is about 16, and in low ambient light, when the image is too dark, and an average exposure value in the center is about 43.

* * * * *